(12) United States Patent
Nanba

(10) Patent No.: US 6,771,431 B2
(45) Date of Patent: Aug. 3, 2004

(54) ZOOM LENS AND CAMERA EQUIPPED WITH ZOOM LENS

(75) Inventor: Norihiro Nanba, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/289,683

(22) Filed: Nov. 6, 2002

(65) Prior Publication Data

US 2003/0099042 A1 May 29, 2003

(30) Foreign Application Priority Data

Nov. 9, 2001 (JP) .......................................... 2001-344506

(51) Int. Cl.⁷ ..................... G02B 15/177; G02B 15/163
(52) U.S. Cl. ......................... 359/682; 359/689; 359/740
(58) Field of Search ................................. 359/680, 681, 359/682, 689, 740

(56) References Cited

U.S. PATENT DOCUMENTS

| | | | |
|---|---|---|---|
| 4,465,343 A | * | 8/1984 | Horimoto ................... 359/680 |
| 4,647,160 A | | 3/1987 | Ikemori |
| 4,810,072 A | | 3/1989 | Takahashi |
| 4,844,599 A | | 7/1989 | Ito |
| 4,999,007 A | | 3/1991 | Aoki et al. |
| 5,035,492 A | | 7/1991 | Ito |
| 5,262,897 A | * | 11/1993 | Kawamura ................... 359/689 |
| 5,270,863 A | | 12/1993 | Uzawa ........................ 359/682 |
| 6,124,984 A | * | 9/2000 | Shibayama et al. ......... 359/689 |
| 6,191,896 B1 | | 2/2001 | Itoh ............................ 359/689 |
| 6,308,011 B1 | | 10/2001 | Wachi et al. ................... 396/72 |

FOREIGN PATENT DOCUMENTS

| | | | | |
|---|---|---|---|---|
| JP | 63-135913 | 6/1988 | | |
| JP | 03-288113 | 12/1991 | | |
| JP | 07-261083 | 10/1995 | | |
| JP | 2003149553 A | * | 5/2003 | ........... G02B/15/20 |

* cited by examiner

Primary Examiner—Georgia Epps
Assistant Examiner—Deborah Raizen
(74) Attorney, Agent, or Firm—Morgan & Finnegan, LLP

(57) ABSTRACT

The disclosed zoom lens includes a first lens unit having a negative optical power, a second lens unit having a positive optical power, and a third lens unit having a positive optical power in order from an object side to an image side. The zoom lens has a shorter interval between the first lens unit and the second lens unit and a longer interval between the second lens unit and the third lens unit on a telephoto end than an interval between the first lens unit and the second lens unit and an interval between the second lens unit and the third lens unit on a wide angle end, respectively.

18 Claims, 17 Drawing Sheets

ZOOM LENS AND CAMERA EQUIPPED WITH ZOOM LENS

BACKGROUND OF THE INVENTION

1. Field of the Invention

The present invention relates to a zoom lens and an optical equipment employing the zoom lens. More specifically, the present invention relates to a zoom lens suited for a video camera and a still camera for films, a digital camera and the like.

2. Related Background Art

Recently, as the functions of an optical equipment (a camera), such as a video camera or a digital camera, employing a solid state image pickup device have advanced, a high-performance, small-sized zoom lens is desired as an optical system employed therein.

A camera of this type is required to use, as an optical system, a lens system having a relatively long back focus since various types of optical members such as a low-pass filter and a color correction filter, are arranged between the last lens and the image pickup device. Further, a color camera which employs an image pickup device for color images is desired to employ an optical system having a good image-side telecentric characteristic to avoid color shading.

Various types of short zoom, wide angle, two-unit zoom lenses each consisting of two lens units, i.e., a first lens unit having a negative optical power (reciprocal number of focal length) and a second lens unit having a positive optical power and which zooms in and out by changing the interval between the two lens units, have been conventionally proposed. A short zoom optical system of this type performs zooming by moving the second lens unit having the positive optical power and focusing in association with the zooming by moving the first lens unit having the negative optical power.

To make a zoom lens compact while keeping a higher zoom ratio, three-unit zoom lenses have been proposed in, for example, Japanese Patent Publication Nos. 7-3507 (corresponding to U.S. Pat. No. 4,810,072) and 6-40170 (corresponding to U.S. Pat. No. 4,647,160). A zoom lens of this type has a third lens unit having a negative or positive optical power, arranged on the image side of the second lens system to thereby compensate for various aberrations which are generated as the magnification of the lens is higher. However, the three-unit zoom lenses are mainly designed for 35-mm film photographs, so that it is difficult to say that the three-unit zoom lens satisfies a requirement of a relatively long back focus and that of a good telecentric characteristic, which are required for a camera employing a solid state image pickup device.

Three-unit zoom lenses which satisfy a back focus requirement and a telecentric characteristic requirement are proposed in, for example, Japanese Patent Application Laid-Open Nos. 63-135913 and 7-261083. In addition, Japanese Patent Application Laid-Open (JP-A) No. 3-288113 (corresponding to U.S. Pat. No. 5,270,863) discloses a three-unit zoom lens in which a first unit having a negative optical power is fixed and a second unit having a positive optical power and a third unit having a positive optical power are moved to perform zooming. According to each of the conventional zoom lenses, however, the number of the constituent elements of each lens unit tends to be relatively large and the entire lens length tends to be large.

According to the three-unit zoom lens disclosed in JP-A-7-261083, a positive lens is arranged to be closest to the object side in a first unit having a negative optical power. Due to this, particularly if the angle of the lens widens, the outer diameter of the lens tends to increase. Further, since the first unit having the negative optical power is moved to thereby focus on a short-distance object, the mechanical structure of the zoom lens tends to be complicated due to the movement of the first unit for focusing and the movement thereof for zooming.

Moreover, U.S. Pat. No. 4,999,007 discloses a three-unit zoom lens consisting of three lens units having negative, positive, and positive optical powers respectively, each lens unit consisting of a single lens. The entire length of this three-unit zoom lens is relatively large on a wide angle end and the first unit is far away from a stop on the wide angle end. Due to this, the incidence height of an off-axis beam is large, whereby the diameter of the lens constituting the first lens unit increases and the entire lens system tends to be large in size. Further, since each of the first and second lens units consists of one lens, it is difficult to compensate for aberrations in each unit. A change in chromatic aberration of magnification during zooming tends to occur particularly in the first unit which has a large change in the height of the off-axis beam from the optical axis. Since the first unit consists of a concave lens, it is insufficient to compensate for the change in the unit and a change in chromatic aberration of magnification tends to increase in the entire lens system.

U.S. Pat. No. 4,824,223 discloses an optical system for a projector which consists of three units having negative, positive and positive optical powers, respectively. According to this optical system, since the first unit consists of one negative lens, aberrations cannot be always sufficiently compensated in the lens unit and a zoom ratio is about 1.7.

The assignee of the present application proposed a three-unit zoom lens consisting of three lens units having negative, positive and positive optical powers, respectively in JP-A-2000-111798 (corresponding to U.S. Pat. No. 6,308,011). This three-unit zoom lens satisfies both the requirement of a back focus having a length necessary to insert a filter or the like into the rear portion of the lens unit and that of telecentric characteristic necessary for a solid state image pickup device, has a zoom ratio of not less than 2, has an entire lens length as short as possible, and thereby attains a compact zoom lens.

JP-A-11-84243 (corresponding to U.S. Pat. No. 6,191, 896) discloses a three-unit zoom lens consisting of three lens units having negative, positive and positive optical powers wherein a stop is disposed in the second lens unit. In zooming from a wide angle end to a telephoto end, the third lens unit is largely moved toward an object side while the interval between the third lens unit and the second lens unit is not greatly changed. If the third lens unit is held in a lens barrel independently of the second lens unit, the third lens is required to have a shaft length corresponding to the movement quantity thereof, making it difficult to make the lens barrel small in size in the optical axis direction.

Further, if the third lens unit is held in the lens barrel of the second lens unit, the shaft length of the third lens unit can be reduced. However, since the driving means of the third lens unit is disposed in the second lens unit which moves during zooming, the mechanical structure of the system tends to be complicated. Besides, since it is also necessary to arrange a stop unit in the lens barrel of the second lens unit, the lens barrel of the second lens unit tends to be large in size.

Likewise, a zoom lens which performs zooming without greatly changing the interval between the second lens unit and the third lens unit is proposed in U.S. Pat. No. 5,270,863.

Furthermore, a three-unit zoom lens consisting of three lens units having negative, positive and positive optical powers, respectively wherein a stop is arranged on an image side of the lens closest to an object side in the second lens unit is disclosed in U.S. Pat. Nos. 5,035,492, 4,844,599 and 5,262,897 and the like. However, each zoom lens disclosed therein has not less than three lenses closer to an image side than the stop in the second lens unit and it is disadvantageously difficult to make the second lens unit compact.

SUMMARY OF THE INVENTION

It is an object of the present invention to provide a zoom lens which is compact and has excellent optical performance and a camera which employs the zoom lens.

To attain this object, a zoom lens according to one aspect of the present invention comprises, in order from an object side to an image side:

a first lens unit having a negative optical power, the first lens unit including a meniscus negative lens element having a concave lens surface on the image side, and a meniscus positive lens element having a convex surface on the object side;

a second lens unit having a positive optical power, the second lens unit including a lens member having a convex lens surface on the object side, an aperture stop, and a lens element the number of which is not more than two in the order from the object side to the image side; and a third lens unit having a positive optical power, wherein the zoom lens has a shorter interval between the first lens unit and the second lens unit and a longer interval between the second lens unit and the third lens unit on a telephoto end than an interval between the first lens unit and the second lens unit and an interval between the second lens unit and the third lens unit on a wide angle end, respectively, and the zoom lens satisfies the following condition, $$0.6<(D12W-D12T)/(D23T-D23W)<2.0,$$

where D12W is the interval between the first lens unit and the second lens unit on the wide angle end, D23W is the interval between the second lens unit and the third lens unit on the wide angle end, D12T is the interval between the first lens unit and the second lens unit on the telephoto end, and D23T is the interval between the second lens unit and the third lens unit on the telephoto end.

The specific configuration of the zoom lens and the other configuration will be apparent from embodiments to be described later.

DESCRIPTION OF THE PREFERRED EMBODIMENTS

Figure 1:
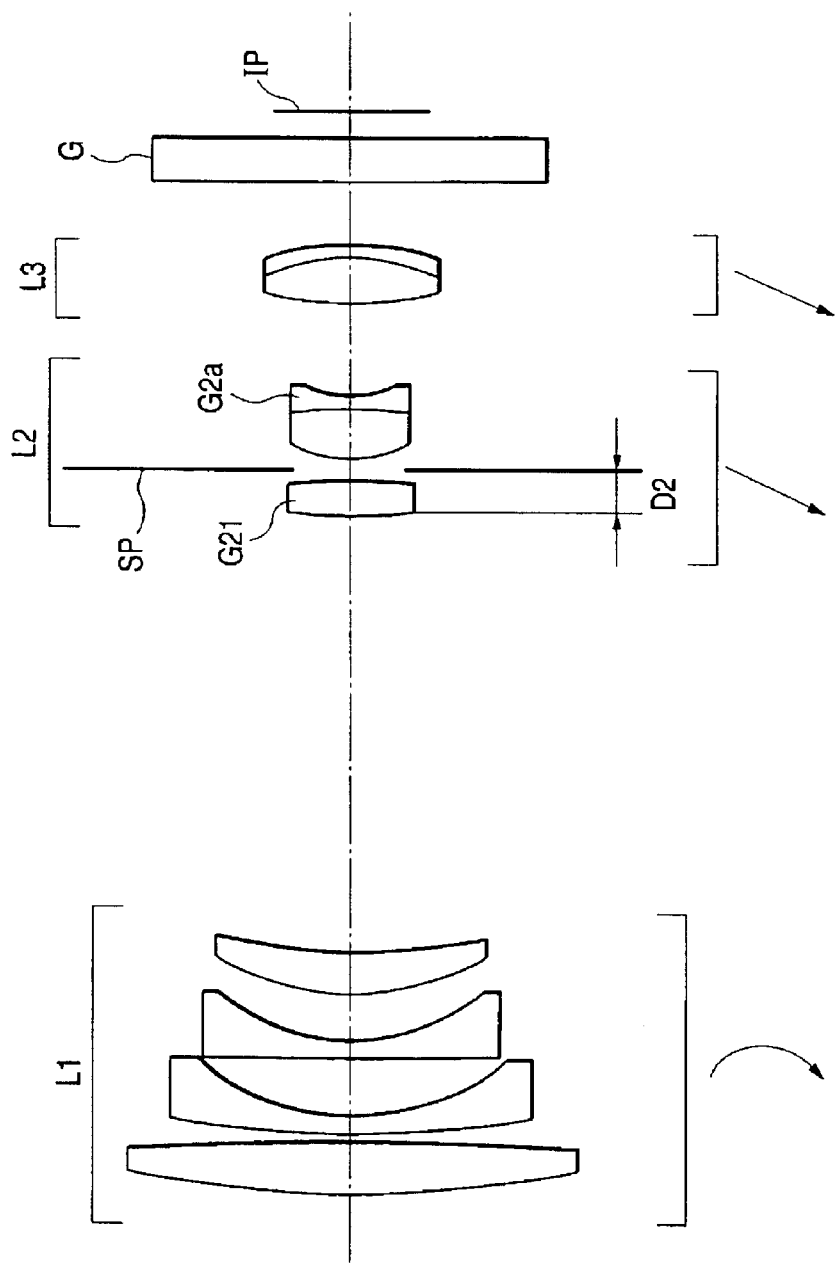
FIG. 1 is an optical cross-sectional view of a zoom lens in a first embodiment according to the present invention.
Figure 2:
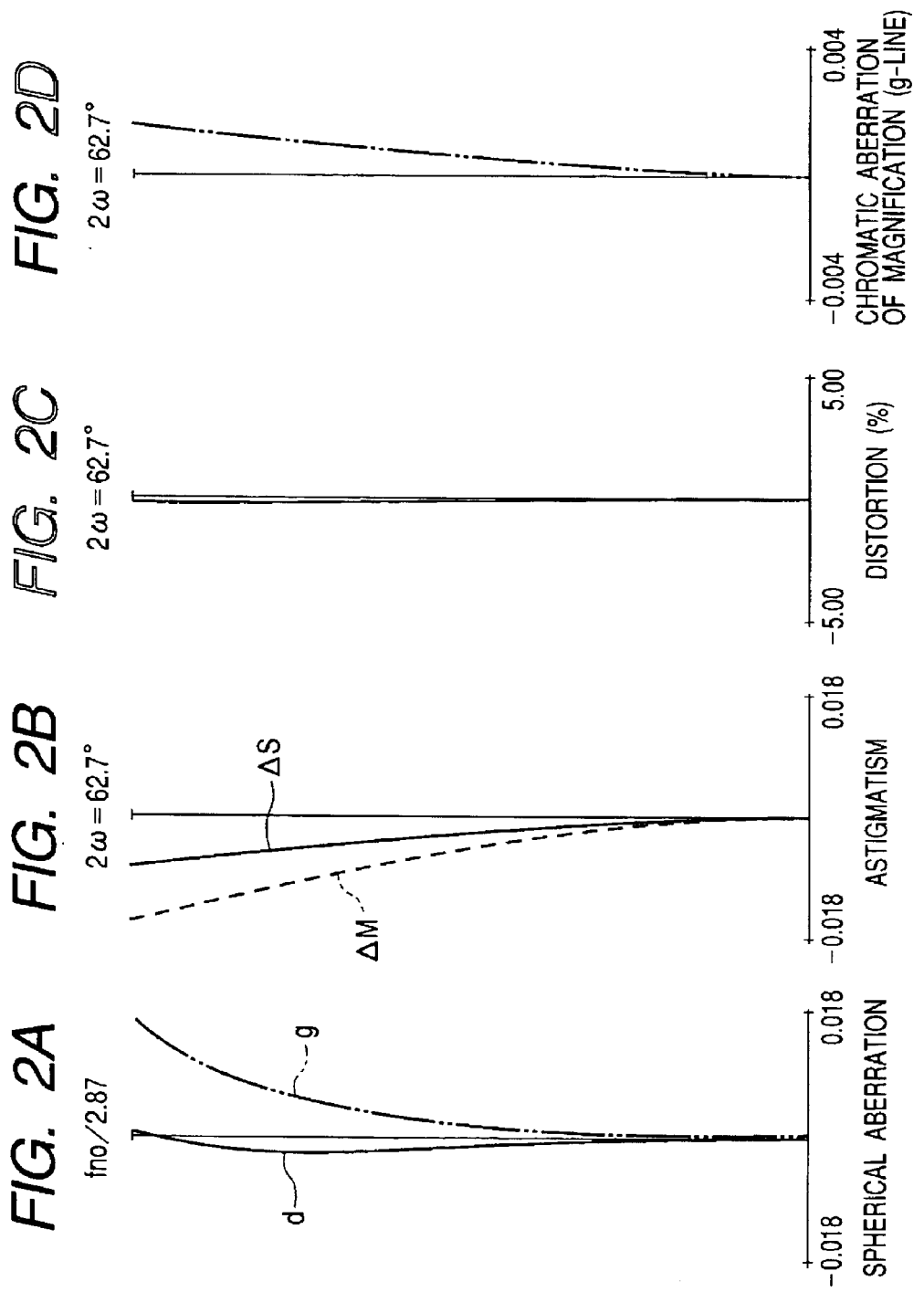
FIGS. 2A, 2B, 2C and 2D show aberrations on a wide angle end in the first embodiment.
Figure 3:
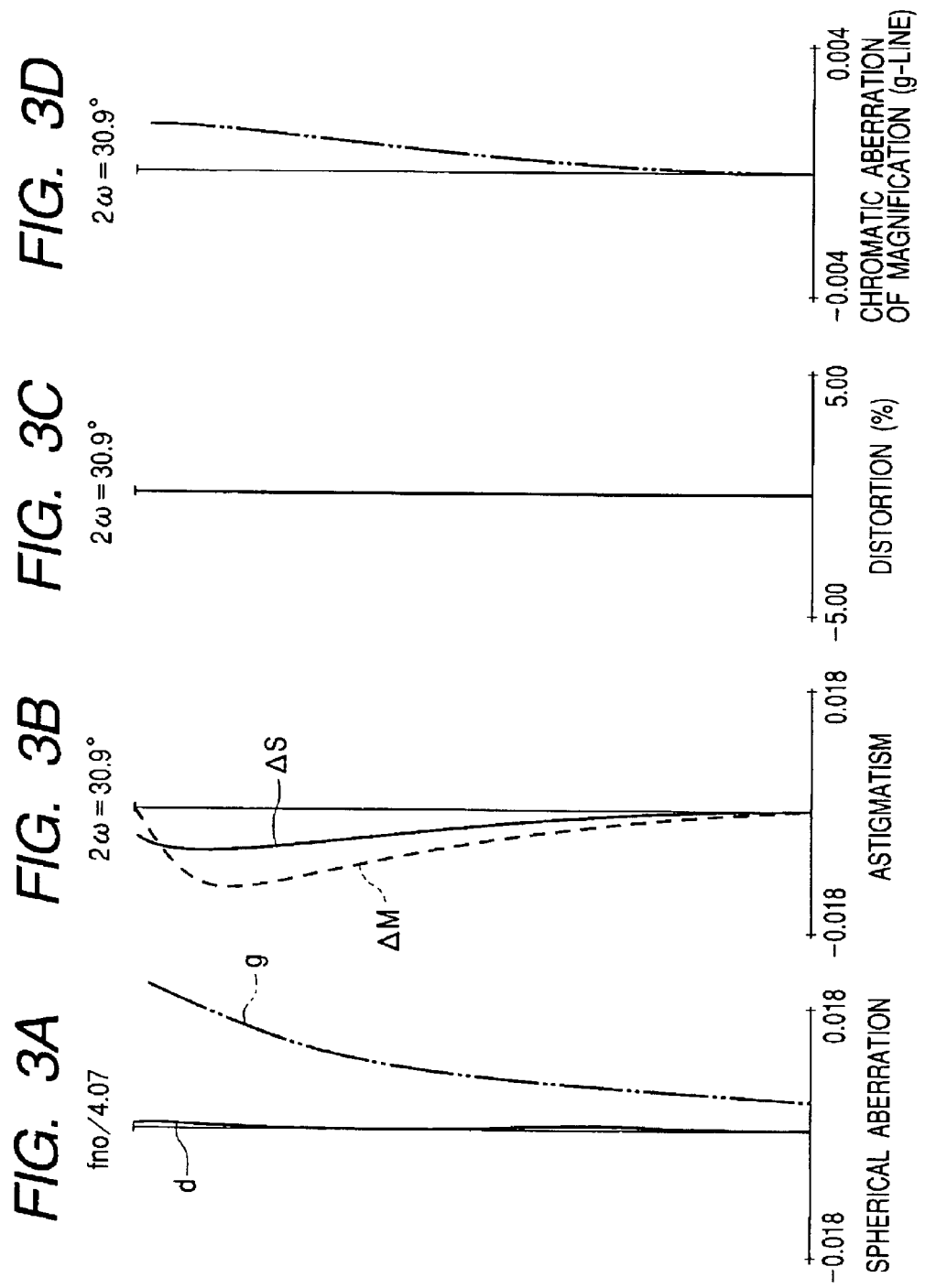
FIGS. 3A, 3B, 3C and 3D show aberrations at an intermediate zoom position in the first embodiment.
Figure 4:
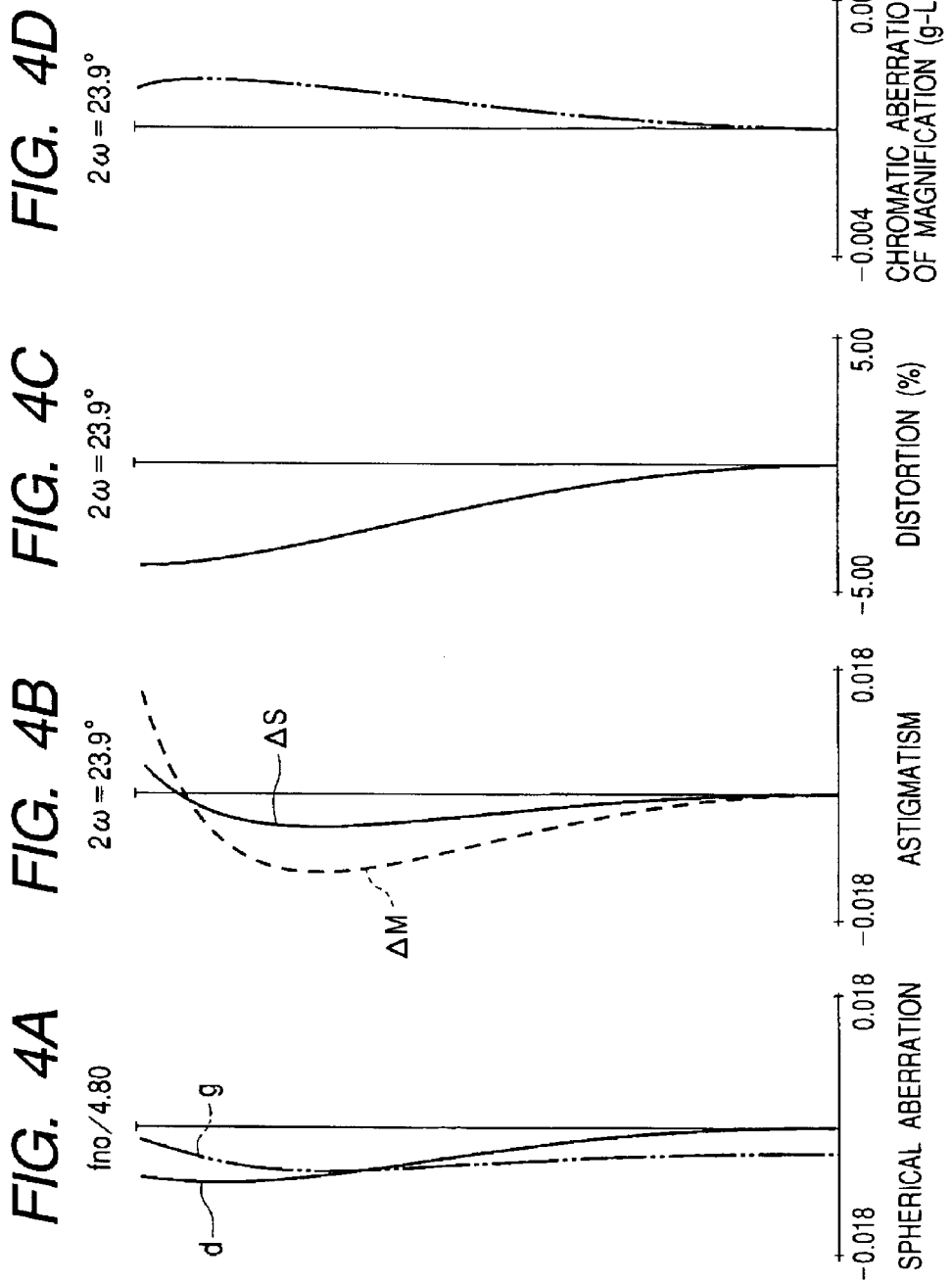
FIGS. 4A, 4B, 4C and 4D show aberrations on a telephoto end in the first embodiment.

FIG. 1 is a lens cross-sectional view of a zoom lens in a first embodiment according to the present invention. FIGS. 2A to 2D, 3A to 3D, and 4A to 4D show aberrations on the wide angle end, the intermediate zoom position and the telephoto end of the zoom lens in the first embodiment, respectively.

Figure 5:
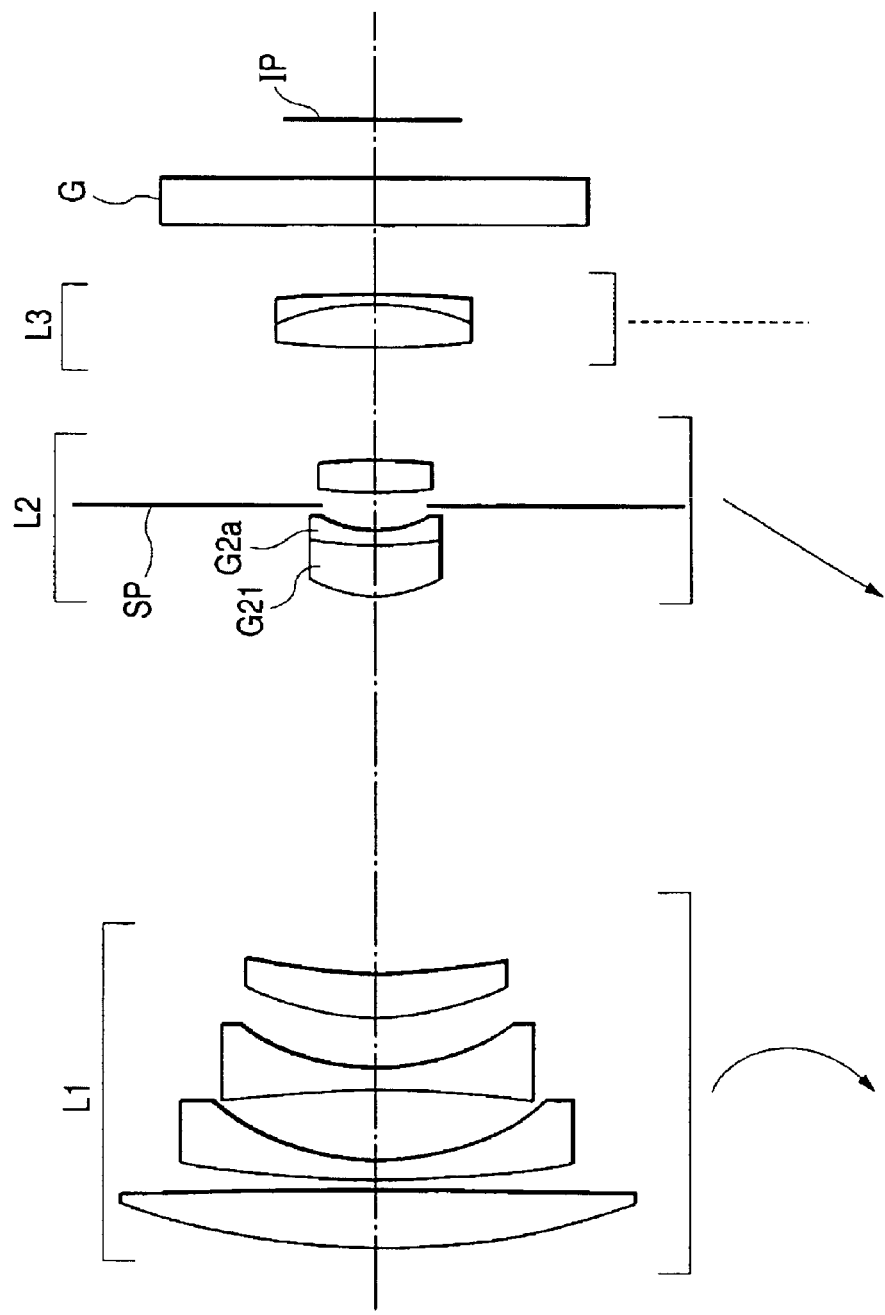
FIG. 5 is an optical cross-sectional view of a zoom lens in a second embodiment according to the present invention.
Figure 6:
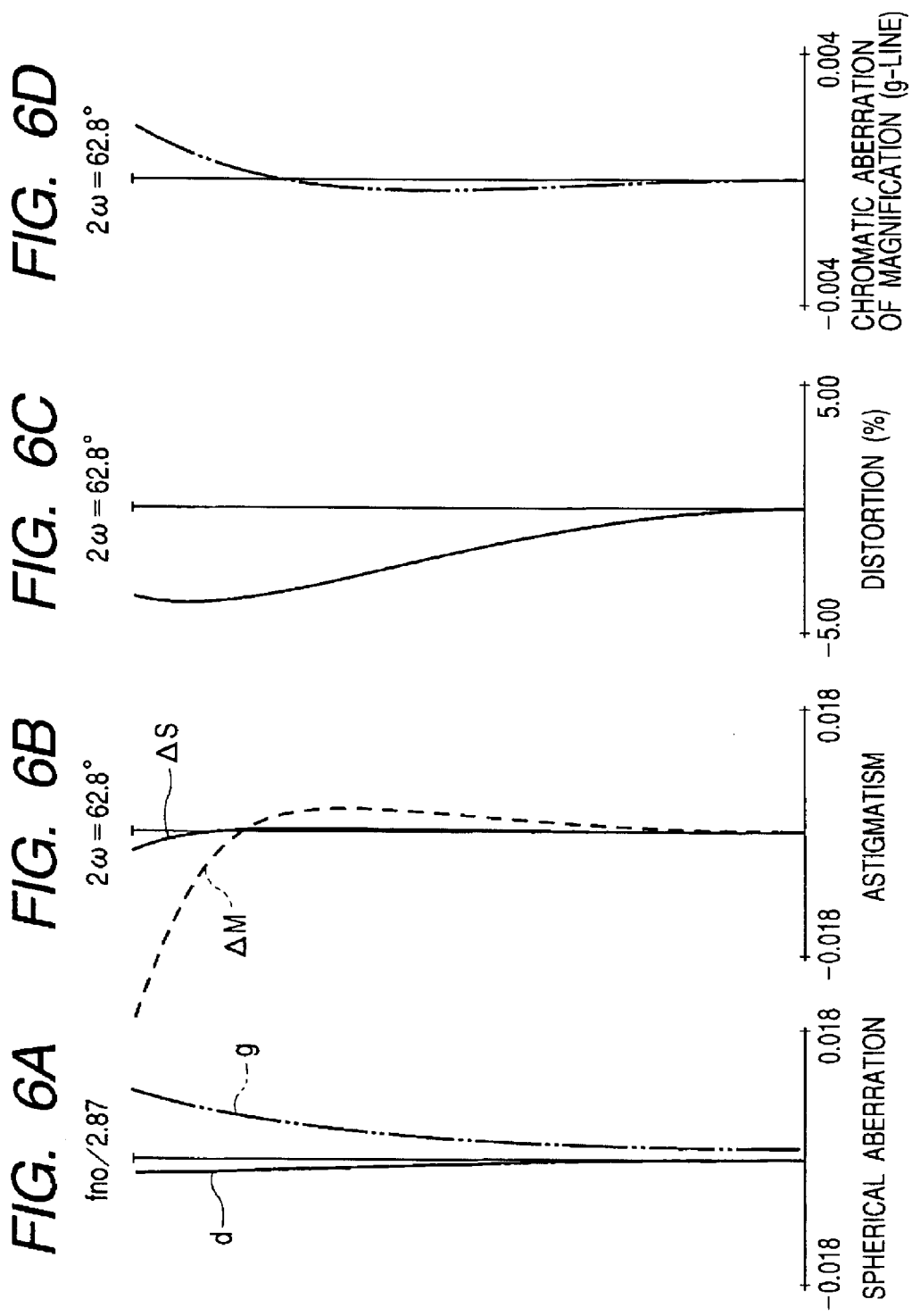
FIGS. 6A, 6B, 6C and 6D show aberrations on a wide angle end in the second embodiment.
Figure 7:
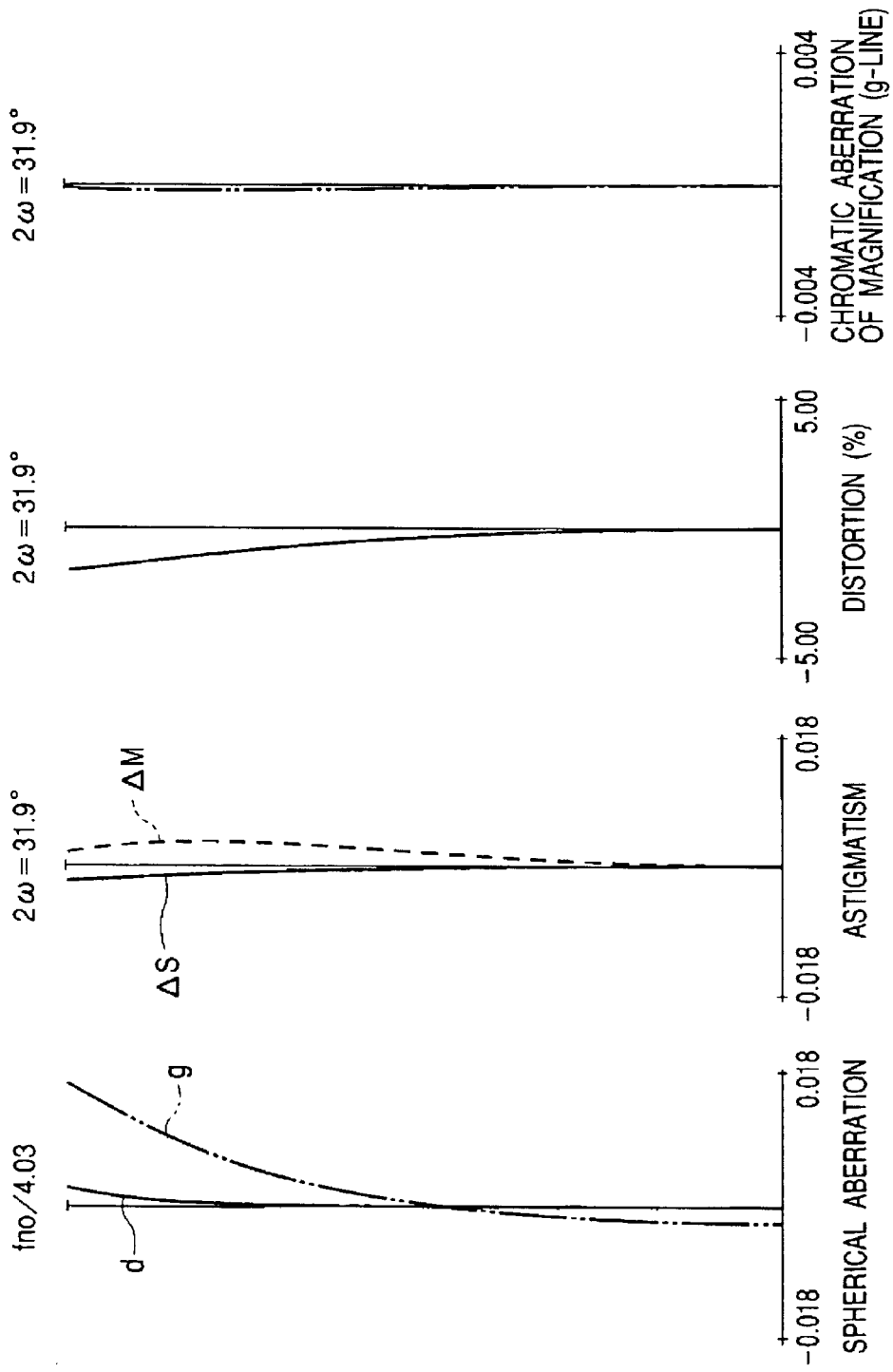
FIGS. 7A, 7B, 7C and 7D show aberrations at an intermediate zoom position in the second embodiment.
Figure 8:
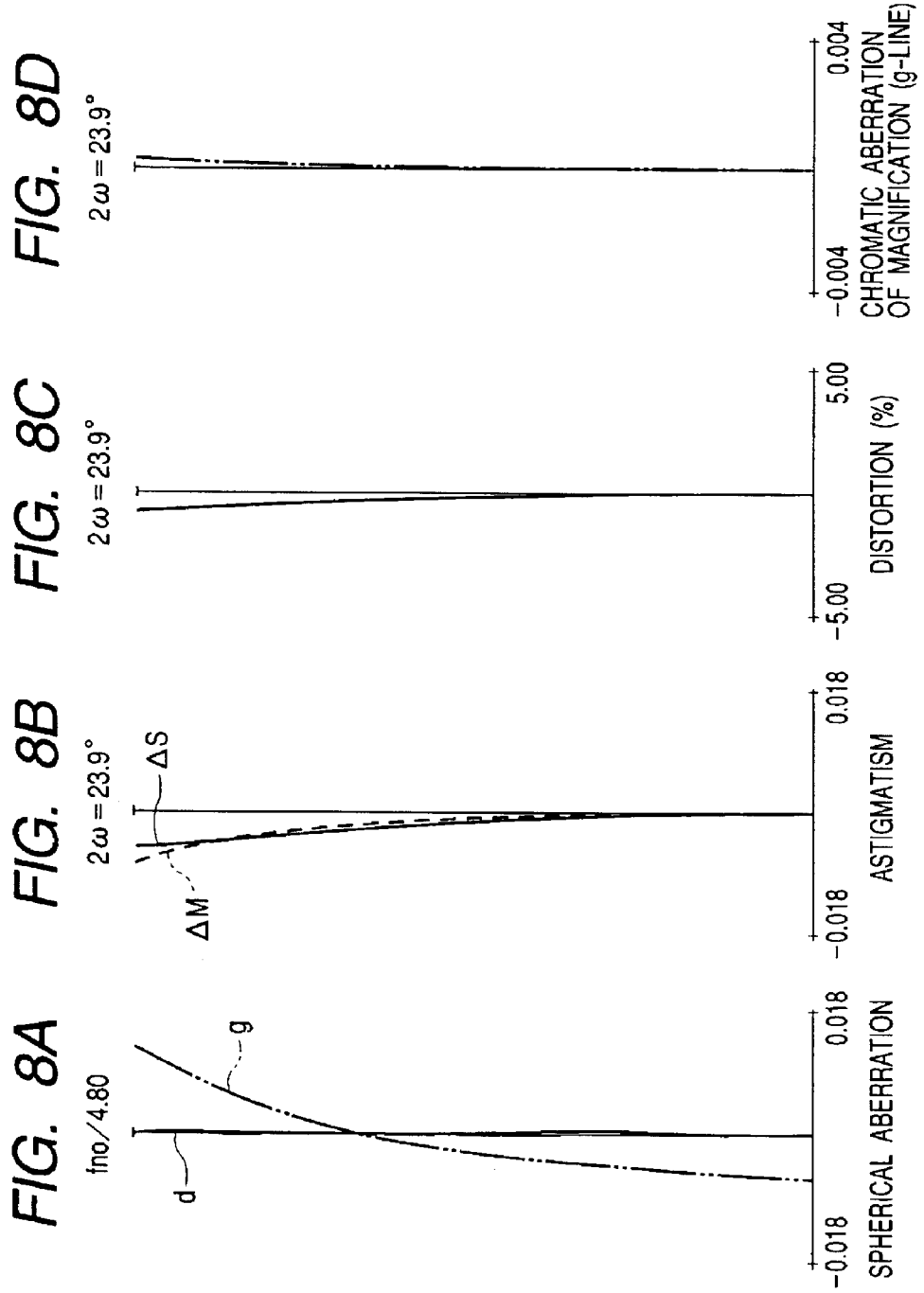
FIGS. 8A, 8B, 8C and 8D show aberrations on a telephoto end in the second embodiment.

FIG. 5 is a lens cross-sectional view of a zoom lens in a second embodiment according to the present invention. FIGS. 6A to 6D, 7A to 7D, and 8A to 8D show aberrations on the wide angle end, the intermediate zoom position and the telephoto end of the zoom lens in the second embodiment, respectively.

Figure 9:
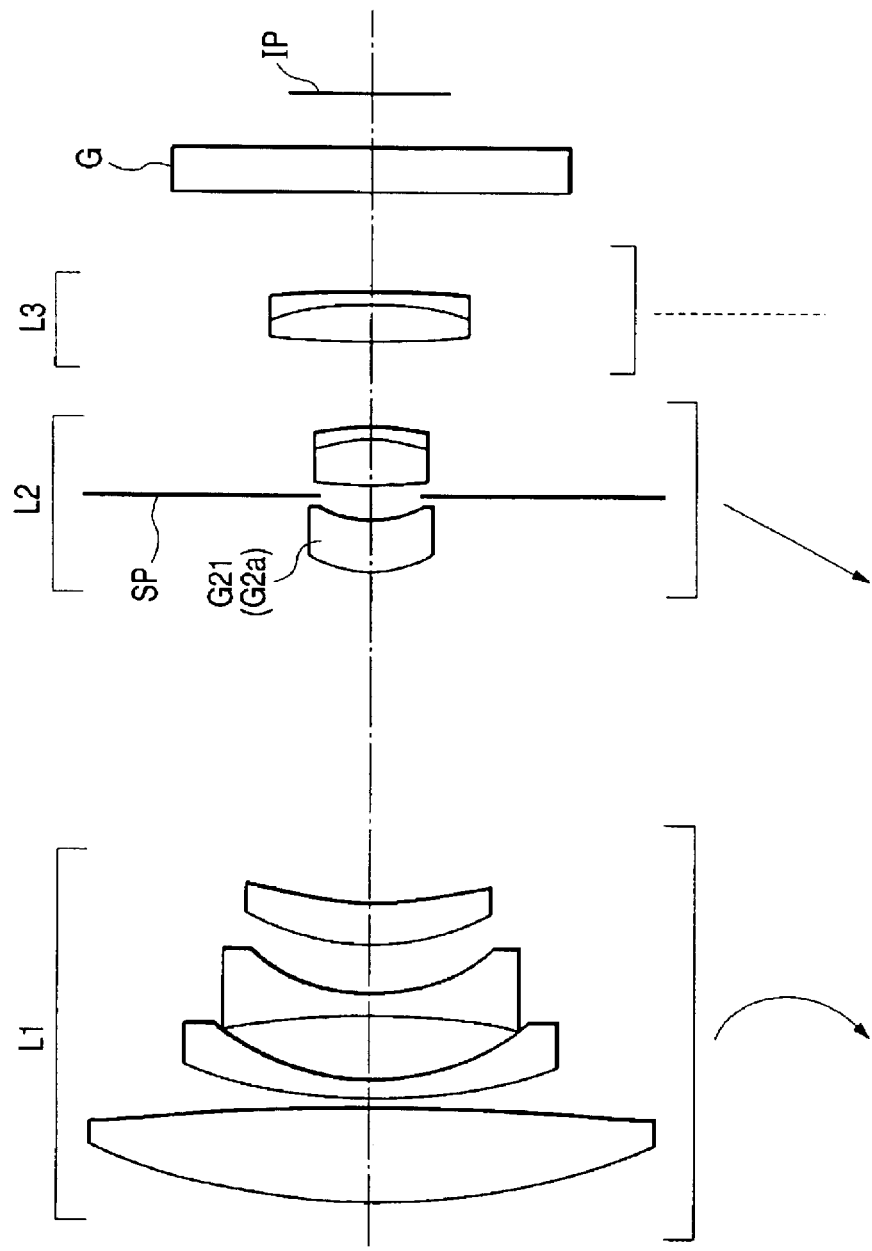
FIG. 9 is an optical cross-sectional view of a zoom lens in a third embodiment according to the present invention.
Figure 10:
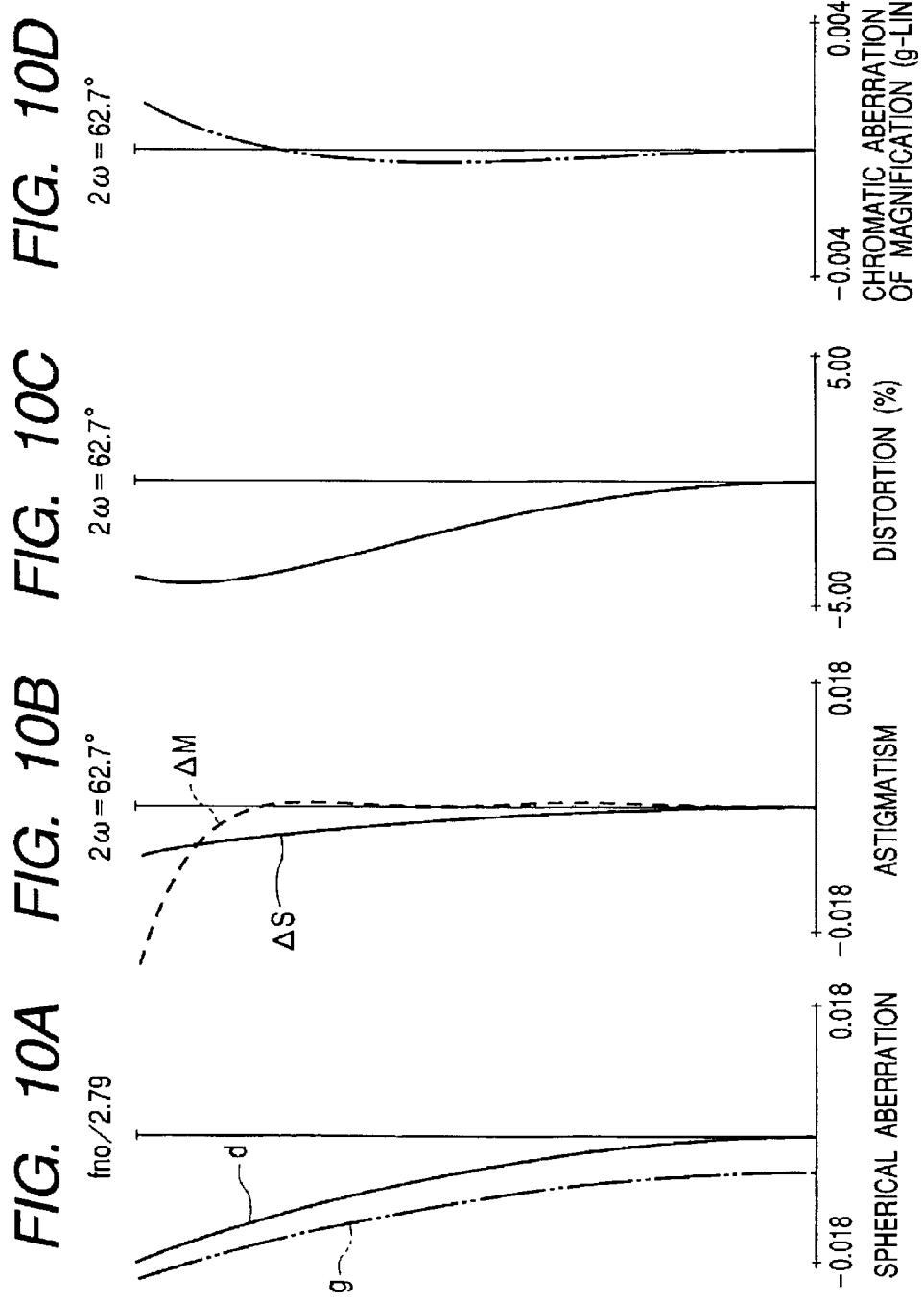
FIGS. 10A, 10B, 10C and 10D show aberrations on a wide angle end in the third embodiment.
Figure 11:
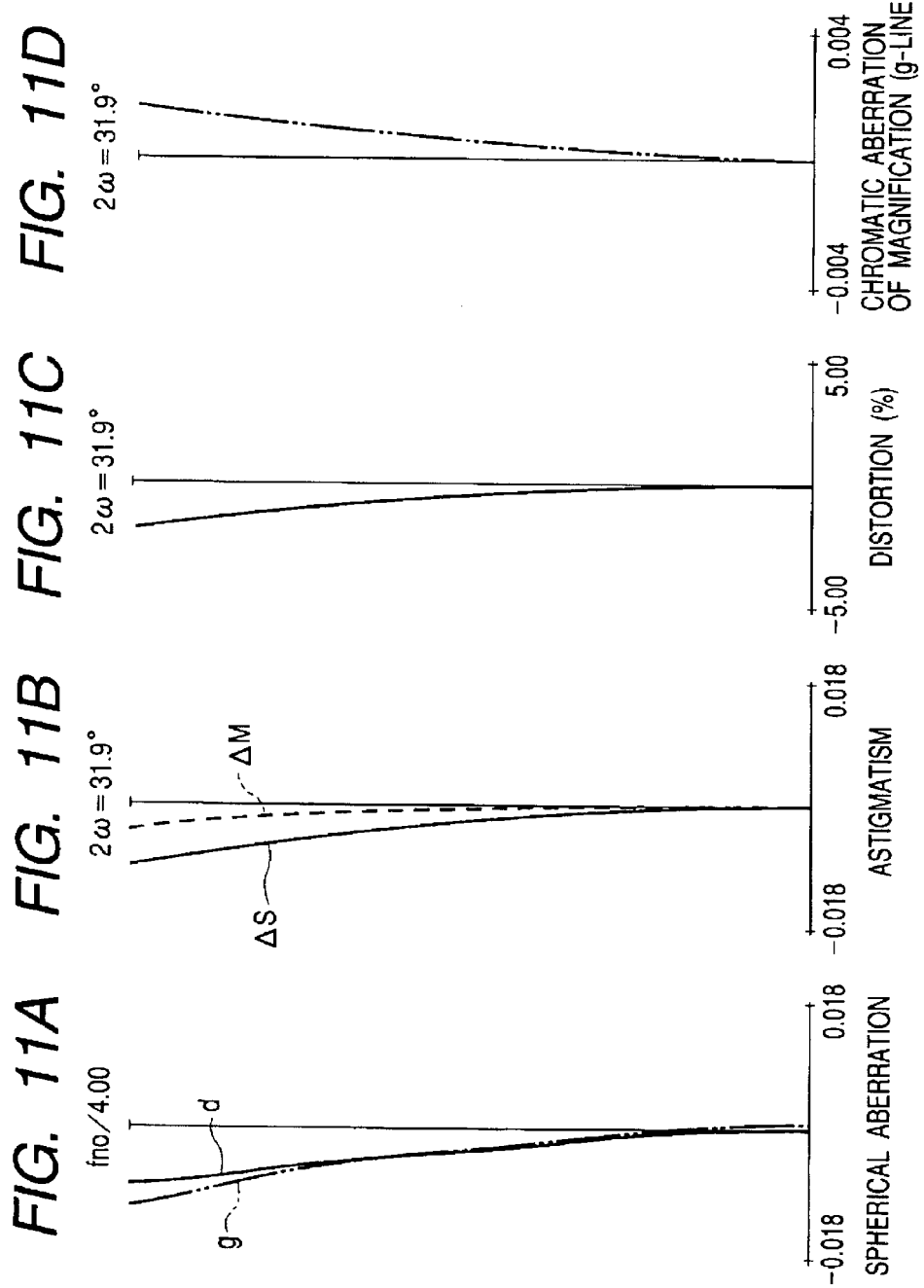
FIGS. 11A, 11B, 11C and 11D show aberrations at an intermediate zoom position in the third embodiment.
Figure 12:
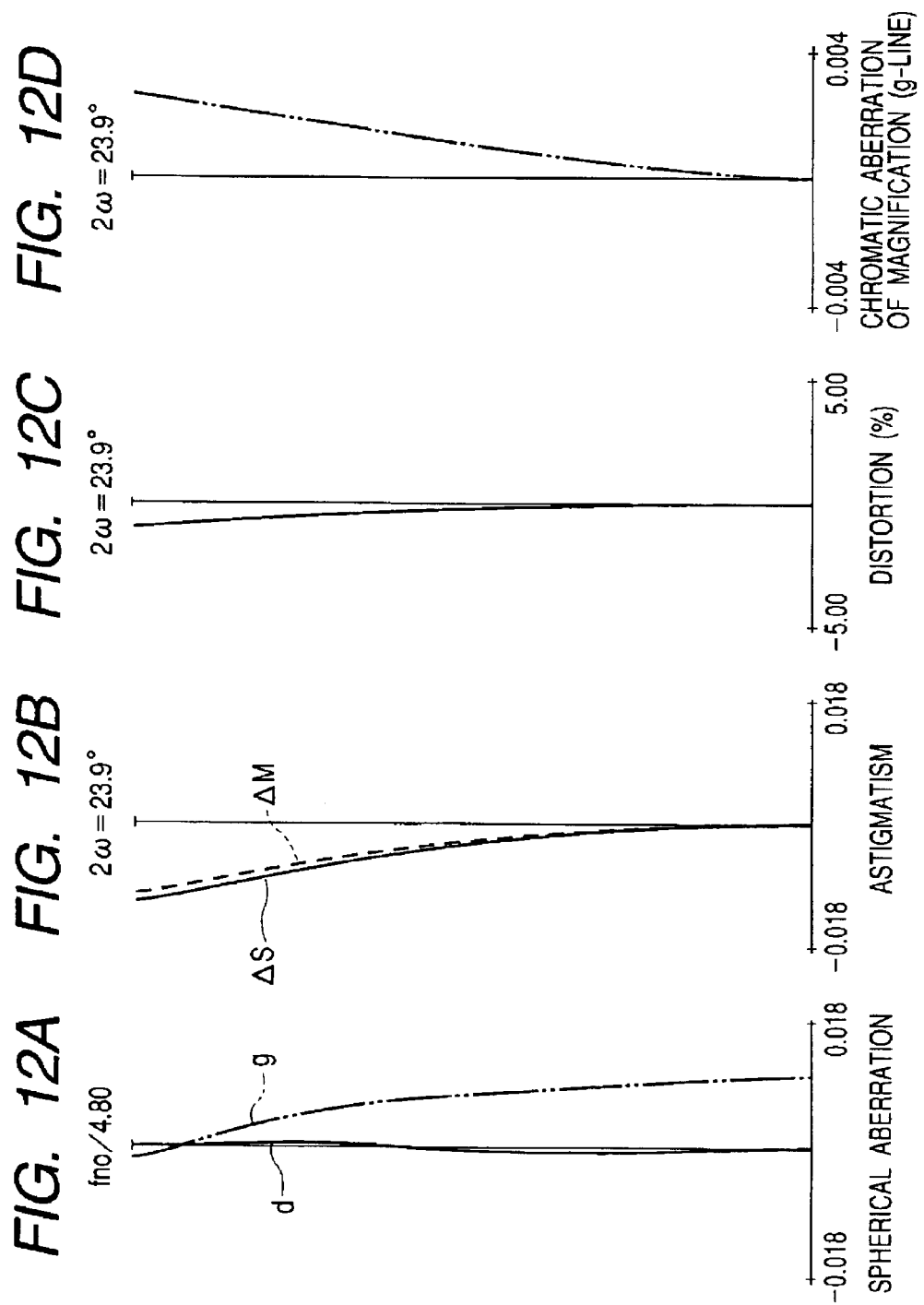
FIGS. 12A, 12B, 12C and 12D show aberrations on a telephoto end in the third embodiment.

FIG. 9 is a lens cross-sectional view of a zoom lens in a third embodiment according to the present invention. FIGS. 10A to 10D, 11A to 11D, and 12A to 12D show aberrations on the wide angle end, the intermediate zoom position and the telephoto end of the zoom lens in the third embodiment, respectively.

Figure 13:
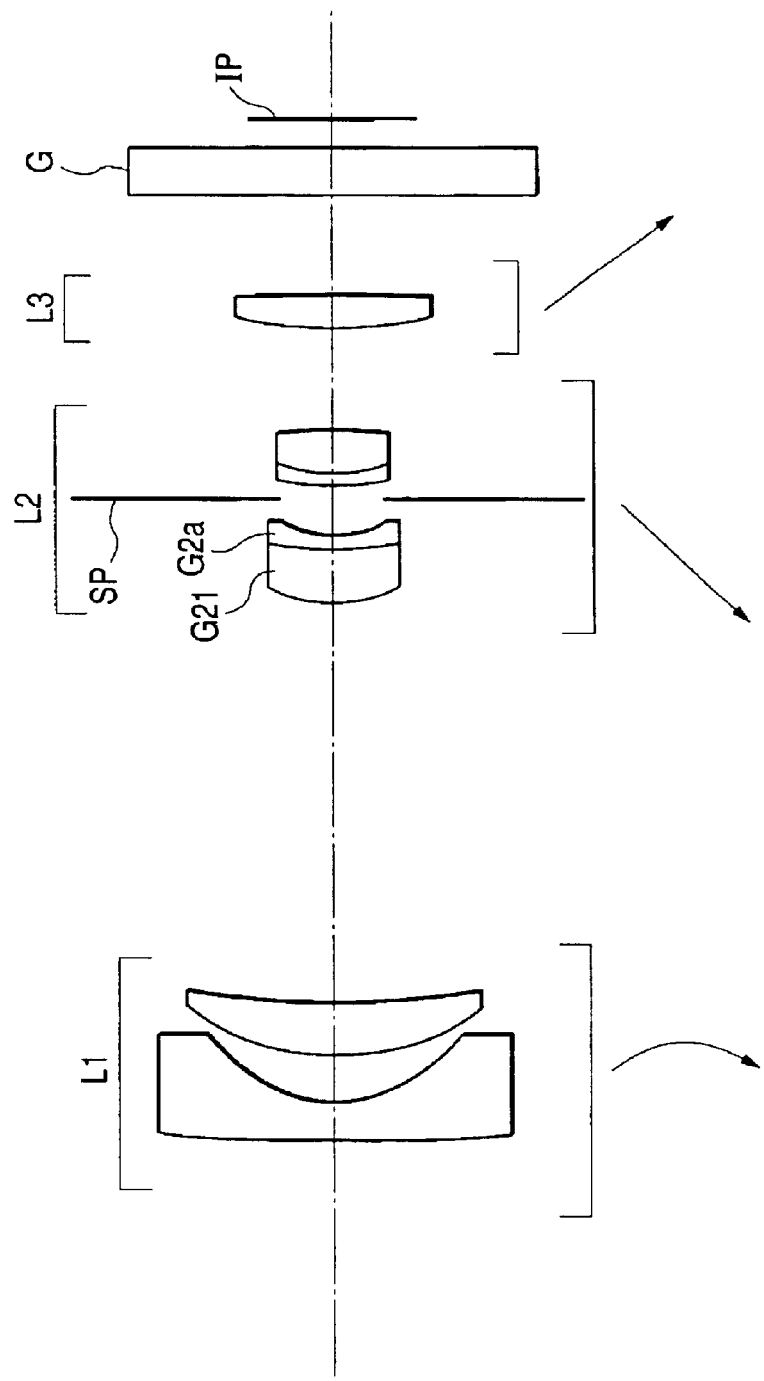
FIG. 13 is an optical cross-sectional view of a zoom lens in a fourth embodiment according to the present invention.
Figure 14:
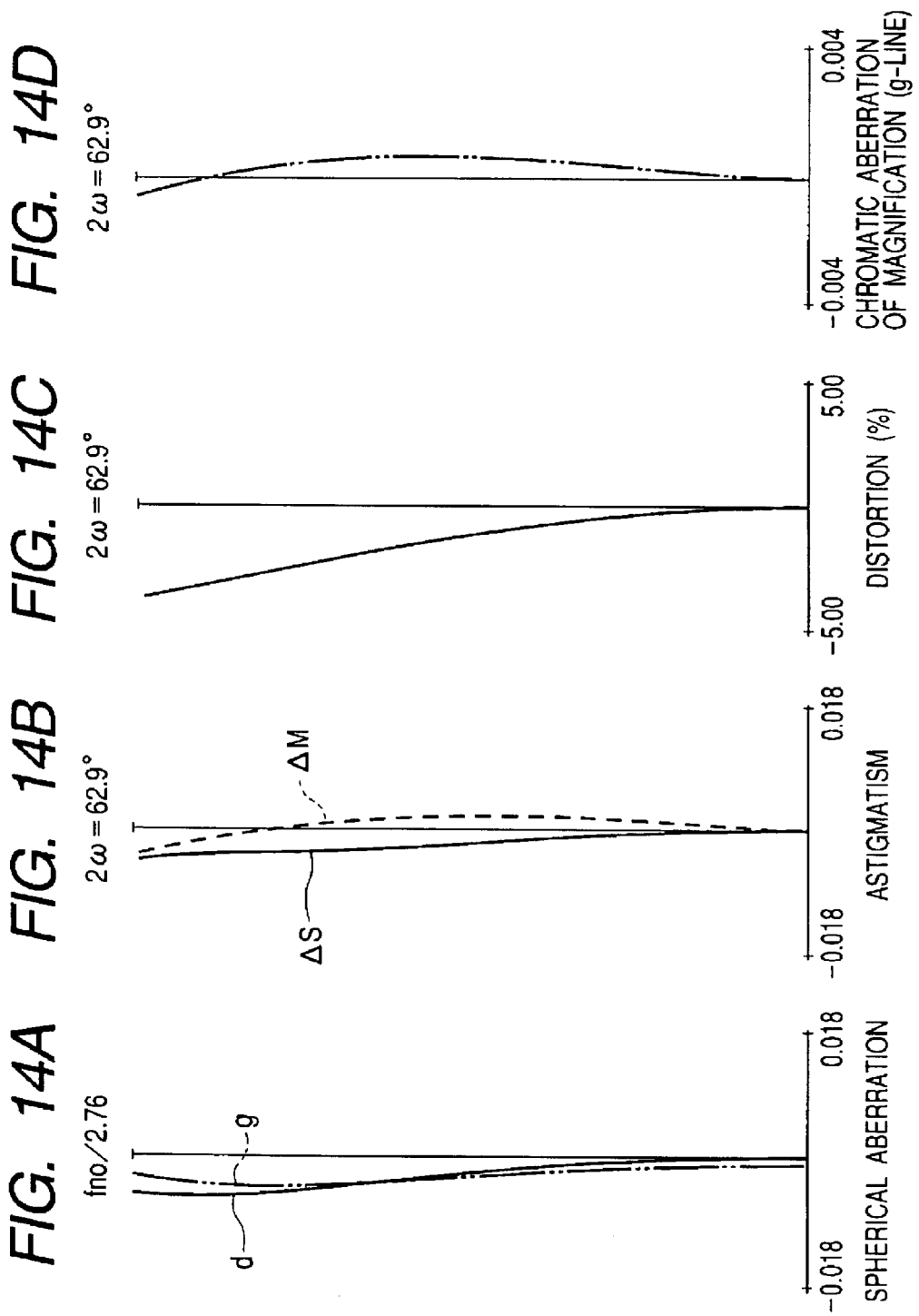
FIGS. 14A, 14B, 14C and 14D show aberrations on a wide angle end in the fourth embodiment.
Figure 15:
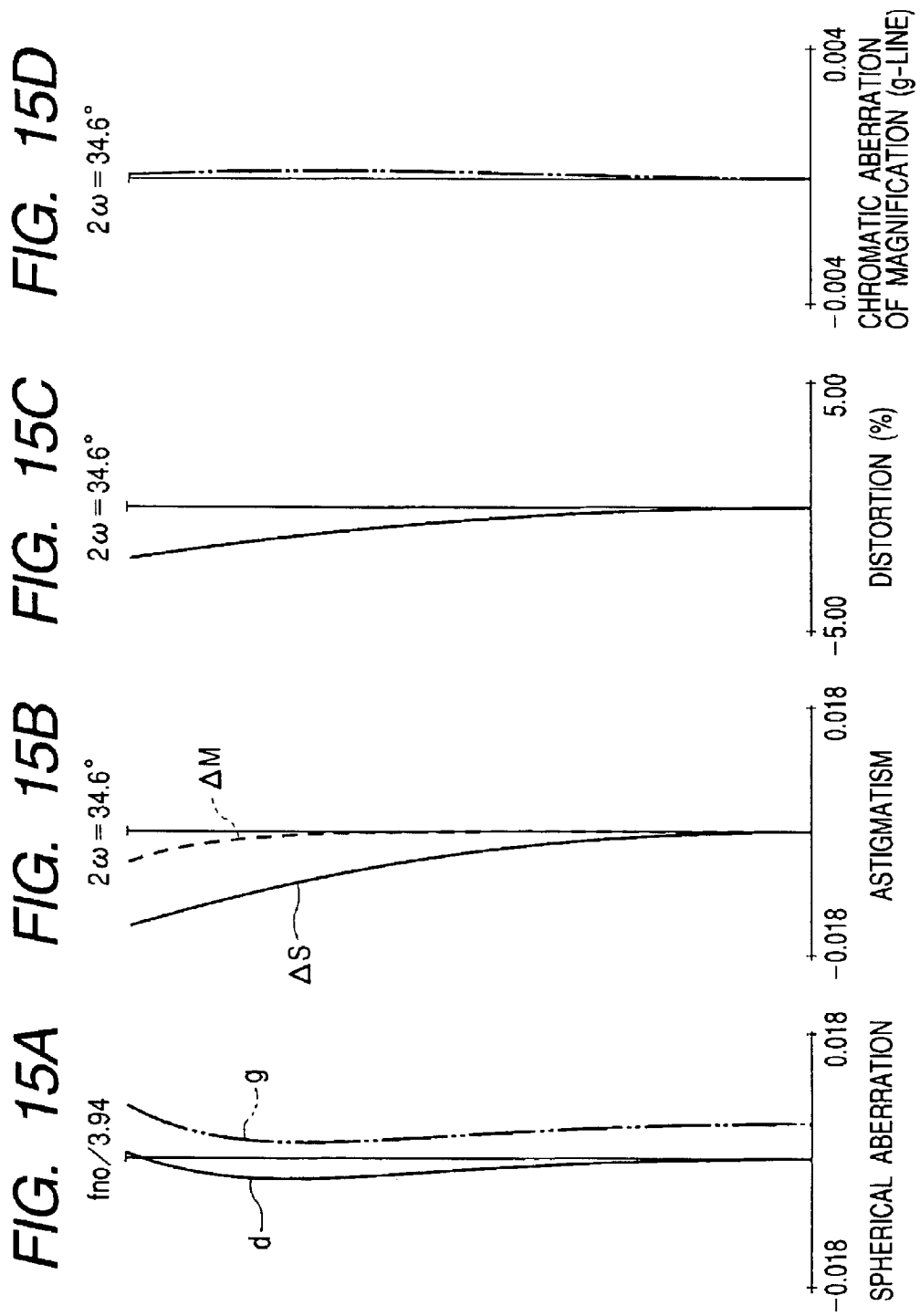
FIGS. 15A, 15B, 15C and 15D show aberrations at an intermediate zoom position in the fourth embodiment.
Figure 16:
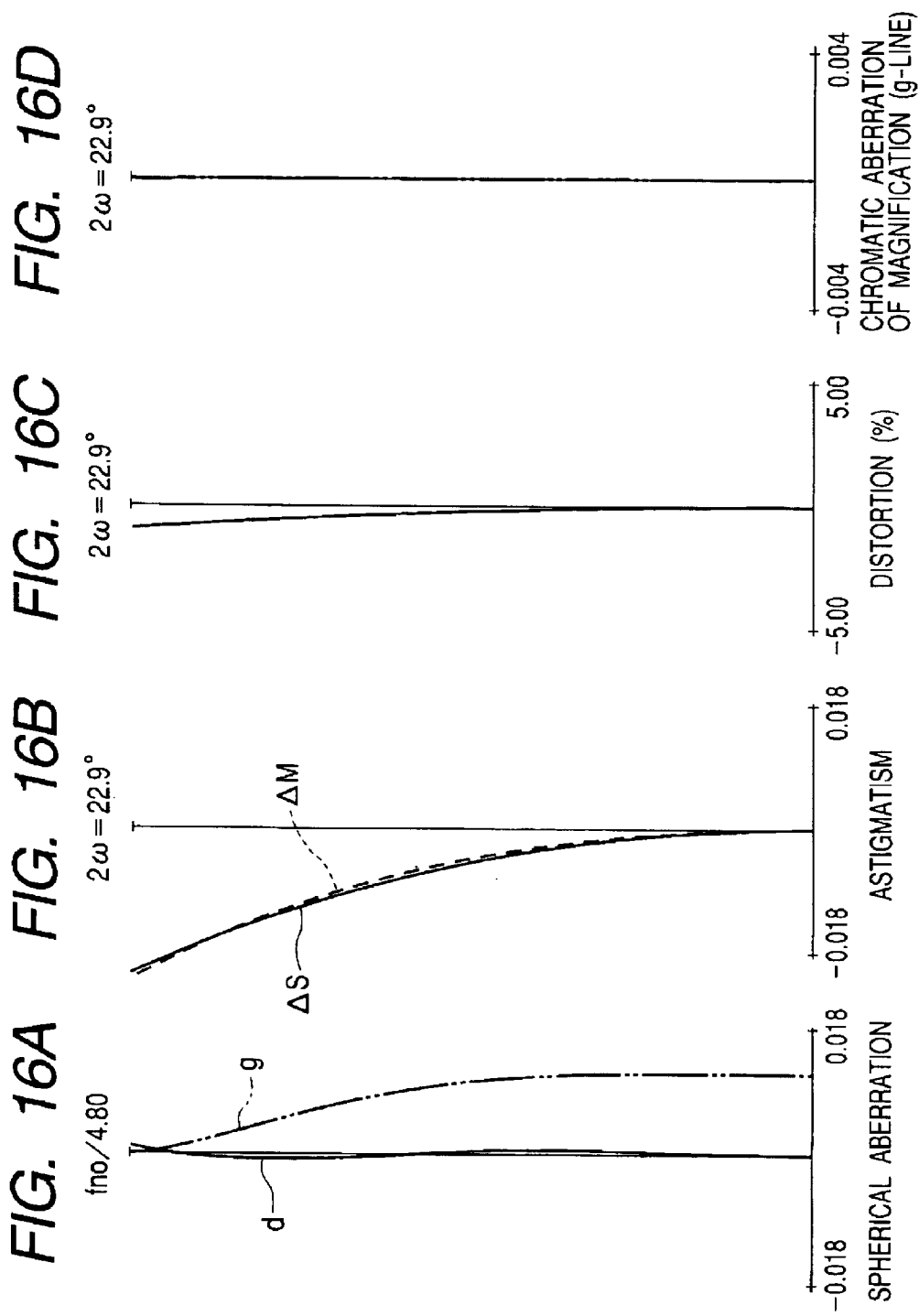
FIGS. 16A, 16B, 16C and 16D show aberrations on a telephoto end in the fourth embodiment.

FIG. 13 is a lens cross-sectional view of a zoom lens in a fourth embodiment according to the present invention. FIGS. 14A to 14D, 15A to 15D, and 16A to 16D show aberrations on the wide angle end, the intermediate zoom position and the telephoto end of the zoom lens in the fourth embodiment, respectively.

Figure 17:
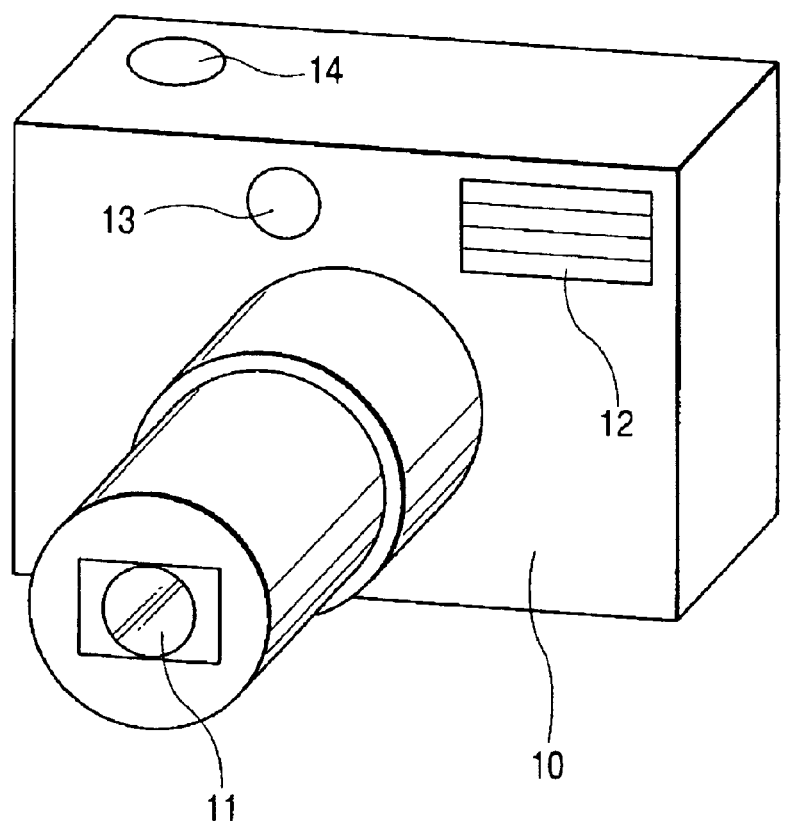
FIG. 17 is a schematic diagram of a camera according to the present invention.

FIG. 17 is a schematic diagram of the important parts of a camera according to the present invention.

In the cross-sectional view of the lens in each embodiment, reference symbol L1 denotes a first lens unit having a negative optical power (reciprocal number of focal length), L2 denotes a second lens unit having a positive optical power, L3 denotes a third lens unit having a positive optical power, SP denotes an aperture stop, IP denotes an image plane on which a solid state image pickup device such as a CCD or CMOS is arranged, and G denotes a glass block corresponding to a filter, a color separation prism or the like.

The zoom lens in each embodiment has three lens units of the first lens unit L1 having a negative optical power, the second lens unit L2 having a positive optical power, and the third lens unit L3 of a positive optical power in order from an object side. During zooming from the wide angle end to the telephoto end, the first lens unit L1 makes an image-side convex reciprocate motion or a part of the motion, the second lens unit L2 moves toward the image side, and the third lens unit L3 moves or is fixed. The aperture stop SP is provided in the second lens unit L2. The interval between the lens units are such that the interval between the first lens unit L1 and the second lens unit L2 on the telephoto end is shorter than that on the wide angle end and the interval between the second lens unit L2 and the third lens unit L3 on the telephoto end is longer than that on the wide angle end.

The zoom lens in each embodiment basically constitutes a so-called wide angle, short zoom system by the first lens unit L1 having the negative optical power and the second lens unit L2 having the positive optical power. The zoom lens varies power by moving the second lens unit L2 having the positive optical power and compensates for the movement of an image point following the varied power by the reciprocate motion of the first lens unit L1.

In each embodiment, the third lens unit L3 has a positive optical power, whereby an image formation with an image side telecentric system necessary for an image pickup apparatus particularly using a solid state image pickup device or the like is realized by imparting the function of a field lens to the third lens unit L3.

Further, a lens G21 closest to an object side in the second lens unit L2 is convex on the object side so as to prevent an off-axis principle ray emerging from the first lens unit L1 from being largely refracted to generate off-axis aberrations. In addition, the lens G21 is preferably convex on the object side so as to suppress the quality of the generation of a spherical aberration with respect to an on-axis light beam emerging from the first lens unit L1 in a divergent state.

In each embodiment, the aperture stop SP is disposed inside of the second lens unit L2. Due to this, the interval between the first lens unit L1 and the second lens unit L2 on the telephoto end can be made shorter than that in the case where the aperture stop SP is disposed on the object side of the second lens unit L2. That is, if the aperture stop SP is disposed on the object side of the second lens unit L2, it is necessary to keep an interval between the first lens unit L1 and the second lens unit L2 to extend to a peripheral portion away from the optical axis so as not to physically contact the first lens unit L1 with the aperture stop SP. In contrast, if the aperture stop SP is disposed inside of the second lens unit L2, it suffices to keep a necessary interval between the first lens unit L1 and the second lens unit L2 on the optical axis since the lens closest to the object side in the second lens unit L2 has a convex surface.

If a lens closest to the image side in the first lens unit L1 has a concave surface, in particular, it is possible to set the vertex of the lens closest to the object side in the second lens unit L2 to be located on the object side relative to the outer peripheral portion of the former lens surface. It is, therefore, possible to shorten the entire length of the zoom lens on the telephoto end as much as possible.

However, as the aperture stop is set closer to the image side, the diameter of the front lens is larger. Therefore, in each embodiment, the aperture stop SP is disposed just after a lens member (a single lens or a composite lens) closest to the object side in the second lens unit L2, whereby the entire length of the zoom lens on the telephoto end is shortened while minimizing an increase in front lens diameter.

Further, in each embodiment, a lens having a concave surface on the image side is disposed in the second lens unit L2. In each embodiment, the third lens unit L3 has a function of a field lens. To set an exit pupil sufficiently far from an image plane, it is necessary to make an off-axis beam incident on the third lens unit L3 while keeping the off-axis beam away from the optical axis to some extent and to refract the beam in the third lens unit L3. On the telephoto end, the interval between the aperture stop SP and the third lens unit L3 is long, so that the off-axis beam can be easily made incident on the third lens unit L3 while keeping the off-axis beam away from the optical axis. On the wide angle end, however, the interval between the aperture stop SP and the third lens unit L3 is short, so that it is necessary to impart a function of separating the off-axis beam from the optical axis, to the second lens unit L2.

In each embodiment, by disposing a lens having a concave surface on the image side inside in the second lens unit L2, the off-axis beam is made away from the optical axis by this concave surface. It is thereby possible to keep the exit pupil away from an image plane in an entire zoom range.

In each embodiment, it is assumed that the interval between the first lens unit L1 and the second lens unit L2 and that between the second lens unit L2 and the third lens unit L3 on the wide angle end are D12W and D23W, respectively and the interval between the first lens unit L1 and the second lens unit L2 and that between the second lens unit L2 and the third lens unit L3 on the telephoto end are D12T and D23T, respectively. It is also assumed that the radius of curvature of the image-side concave lens surface of the lens G2a in the second lens unit L2 is Rn, the focal length of the second lens unit L2 is f2, and the distance from the vertex of the surface of the lens closest to the object side in the second lens unit L2 to the aperture stop SP is D2sp. If so, the zoom lens satisfies the following conditional expressions:

$$0.6 < (D12W - D12T)/(D23T - D23W) < 2.0 \quad (1),$$

$$0.2 < Rn/f2 < 0.5 \quad (2),$$

and $$0.1 < D2sp/f2 < 0.4 \quad (3).$$

The conditional expression (1) specifies the movement of each lens unit during zooming. Since the first lens unit L1 makes a reciprocate motion during zooming, the position of the wide angle end and that of the telephoto end in the optical axis direction do not greatly differ from each other. The conditional expression (1) particularly specifies the movement of the third lens unit L3.

For example, if the position of the wide angle end and that of the telephoto end in the optical axis direction of the first lens unit L1 coincide with each other and the position of the wide angle end and that of the telephoto end in the optical axis direction of the third lens unit L3 coincide with each other, a value of 1 is given from the conditional expression (1). The conditional expression (1) is in a range which includes the value 1. If the conditional expression (1) is satisfied, the third lens unit L3 is constituted so that the position of the wide angle end and that of the telephoto end do not greatly differ. If the movement of the third lens unit L3 exceeds the upper limit of the range of the conditional expression (1) and the third unit L3 largely moves toward the object direction from the wide angle end to the telephoto end, the third lens unit L3 is required to have a movement amount corresponding to the sum of the movement thereof for zooming and the feed amount thereof for near focusing on the telephoto end. As a result, the shaft length of the third lens unit L3 for driving the unit L3 in the optical axis direction increases, thereby making it difficult to make the lens barrel of the third unit L3 small in size.

Furthermore, if the third lens unit L3 largely moves toward the image side direction from the wide angle end to the telephoto end so as to be below the lower limit of the range of the conditional expression (1), the exit pupil has great change. Due to this, if a solid state image pickup device is employed, it is undesirably impossible to obtain a good image in an entire zoom range.

The conditional expression (2) specifies the radius of curvature of the concave surface of the lens G2a facing toward the image side in the second lens unit L2. If the radius of curvature is so large that it exceeds the upper limit of the range of the conditional expression (2) (i.e. the curvature is gentle), a function for separating the off-axis beam from the optical axis weakens, with the result that it is undesirably impossible to set the exit pupil on the wide angle end sufficiently away from the image plane. If the radius of curvature of the concave surface of the lens G2a facing toward the image side in the second lens unit L2 is so small to be below the lower limit of the range of the conditional expression (2) (i.e. the curvature is sharp), a difference between the incident angle of the upper marginal beam on that surface and the incident angle of the lower marginal beam on that surface in an off-axis beam becomes large, with the result that a coma-aberration becomes undesirably conspicuous.

The conditional expression (3) specifies the position of the aperture stop SP in the optical axis direction. If the aperture stop SP is so located toward the image side as to exceed the upper limit of the range of the conditional expression (3), the front lens diameter increases, making it difficult to provide a compact zoom lens. In the case below the lower limit of the range of the conditional expression (3), the thickness of center of the lens closest to the object side in the second lens unit L2 is thin and the aperture stop SP is arranged adjacent the lens closest to the object side. In this case, the curvature of the lens closest to the object side in the second lens unit L2 becomes gentle. As a result, the convergent effect on the beam emerging from the first lens unit L1 in a divergent state weakens, thereby undesirably, insufficiently compensating for the spherical aberration.

The zoom lens in each embodiment simultaneously satisfies the conditional expressions (1) to (3). However, even if the zoom lens satisfies at least one of the conditional expressions (1) to (3), it is also possible to attain the advantages stated above resulting from the satisfaction of the respective conditional expressions.

In each embodiment, it is more preferable to set the numerical ranges of the conditional expressions (1) to (3) as follows:

$$0.7<(D12W-D12T)/(D23T-D23W)<1.8 \quad (1a),$$

$$0.25<Rn/f2<0.4 \quad (2a),$$

and $$0.15<D2sp/f2<0.37 \quad (3a).$$

In the zoom lens according to the first embodiment, the first lens unit L1, the second lens unit L2 and the third lens unit L3 consist of the following elements in order from the object side. The first lens unit L1 consists of a positive lens having both convex lens surfaces, a meniscus negative lens having a convex lens surface on the object side, a negative lens having both concave lens surfaces, and a meniscus positive lens having a convex lens surface on the object side. The second lens unit L2 consists of a positive lens G21 having both convex lens surfaces, an aperture stop SP, a cemented lens comprised of a positive lens having both convex lens surfaces and a negative lens G2a having both concave lens surfaces. The third lens unit L3 consists of a cemented lens comprised of a positive lens having both convex lens surfaces and a negative lens having a concave lens surface on the object side.

In the zoom lens according to the second embodiment, the first lens unit L1, the second lens unit L2 and the third lens unit L3 consist of the following elements in order from the object side. The first lens unit L1 consists of a positive lens having both convex lens surfaces, a meniscus negative lens having a convex lens surface on the object side, a negative lens having both concave lens surfaces, and a meniscus positive lens having a convex surface on the object side. The second lens unit L2 consists of a cemented lens comprised of a meniscus positive lens G21 having a convex lens surface on the object side and a meniscus negative lens G2a having a convex lens surface on the object side, an aperture stop SP, and a positive lens having both convex lens surfaces. The third lens unit L3 consists of a cemented lens comprised of a positive lens having both convex lens surfaces and a negative lens having a concave lens surface on the object side.

In the zoom lens according to the third embodiment, the first lens unit L1, the second lens unit L2 and the third lens unit L3 consist of the following elements in order from the object side. The first lens unit L1 consists of a positive lens having both convex lens surfaces, a meniscus negative lens having a convex lens surface on the object side, a negative lens having both concave lens surfaces, and a meniscus positive lens having a convex lens surface on the object side. The second lens unit L2 consists of a lens G21 (G2a) having a convex lens surface on the object side, an aperture stop SP, and a cemented lens comprised of a positive lens having both convex lens surfaces and a negative lens having a concave lens surface on the object side. The third lens unit L3 consists of a cemented lens comprised of a positive lens having both convex lens surfaces and a negative lens having a concave lens surface on the object side.

In the zoom lens according to the fourth embodiment, the first lens unit L1, the second lens unit L2 and the third lens unit L3 consist of the following elements in order from the object side. The first lens unit L1 consists of a meniscus negative lens having a convex lens surface on the object side, and a meniscus positive lens having a convex surface on the object side. The second lens unit L2 consists of a cemented lens comprised of a meniscus positive lens G21 having a convex lens surface on the object side and a meniscus negative lens G2a having a convex lens surface on the object side, an aperture stop SP, and a cemented lens comprised of a meniscus negative lens having a convex lens surface on the object side and a positive lens having both convex lens surfaces. The third lens unit L3 consists of a positive lens having both convex lens surfaces.

The numerical examples 1 to 4 of the first to fourth embodiments, respectively, are shown below. In each numerical example, symbol f denotes a focal length, Fno denotes an F number, and ω denotes a photographing half angle of field. Symbol i (=1, 2, 3 . . . ) denotes the order of lens surfaces from the object side, Ri denotes a radius of curvature of a lens surface, Di denotes the lens thickness or air-reduced distance between the $i^{th}$ surface and the $(i+1)^{th}$ surface, and νi and Ni denote Abbe's number and the refractive index of an $i^{th}$ optical member with respect to d-line, respectively. Further, the two surfaces closest to the image side are those of a filter member corresponding to a crystal low-pass filter, an infrared cut filter or the like. In addition, B, C, D, E and F are aspherical coefficients. When a displacement in the optical axis direction at a position of a height H from the optical axis is assumed to be x on the condition where a surface vertex is reference, the shape of an aspherical surface is expressed as follows:

$$X = \frac{(1/R)H^2}{1 + \sqrt{1 - (1+K)(H/R)^2}} + BH^4 + CH^6 + DH^8 + EH^{10} \quad \text{(Expression 1)}$$

In the expression 1, R denotes a radius of curvature and K denotes a cone constant. "e-X" means "×10$^{-x}$".

The relationship between the respective conditional expressions and the numerical values in the numerical examples is shown in Table 1.

NUMERICAL EXAMPLE 1

| | | | |
|---|---|---|---|
| f = 1 to 2.87 | Fno = 2.87 to 4.80 | 2ω = 62.7° to 23.9° | |
| R1 = 8.517 | D1 = 0.41 | N1 = 1.712995 | ν1 = 53.9 |
| R2 = −48.127 | D2 = 0.07 | | |
| R3 = 7.281 | D3 = 0.15 | N2 = 1.834000 | ν2 = 37.2 |
| R4 = 1.733 | D4 = 0.47 | | |
| R5 = 44.462 | D5 = 0.15 | N3 = 1.531717 | ν3 = 48.8 |
| R6 = 1.527 | D6 = 0.38 | | |
| R7 = 1.959 | D7 = 0.33 | N4 = 1.846660 | ν4 = 23.9 |
| R8 = 3.985 | D8 = Variable | | |
| R9 = 4.079 | D9 = 0.29 | N5 = 1.743300 | ν5 = 49.3 |
| R10 = −4.160 | D10 = 0.09 | | |
| R11 = Stop | D11 = 0.09 | | |
| R12 = 0.937 | D12 = 0.40 | N6 = 1.712995 | ν6 = 53.9 |
| R13 = −2.335 | D13 = 0.10 | N7 = 1.672700 | ν7 = 32.1 |
| R14 = 0.654 | D14 = Variable | | |
| R15 = 3.035 | D15 = 0.36 | N8 = 1.517417 | ν8 = 52.4 |
| R16 = −1.479 | D16 = 0.09 | N9 = 1.846660 | ν9 = 23.9 |
| R17 = −2.372 | D17 = Variable | | |
| R18 = ∞ | D18 = 0.36 | N10 = 1.516330 | ν10 = 64.1 |
| R19 = ∞ | | | |

| | Focal Length | | |
|---|---|---|---|
| Variable Interval | 1.00 | 2.12 | 2.87 |
| D8 | 3.54 | 0.93 | 0.31 |
| D14 | 0.74 | 1.84 | 2.64 |
| D17 | 0.50 | 0.61 | 0.69 |

Aspherical Coefficient

R10 k = −8.43033e−01  B = 1.94116e−02  C = −3.81432e−03
D = 1.00799e−01  E = −1.81189e−01

NUMERICAL EXAMPLE 2

| | | | |
|---|---|---|---|
| f = 1 to 2.88 | Fno = 2.87 to 4.80 | 2ω = 62.8° to 23.9° | |
| R1 = 5.137 | D1 = 0.44 | N1 = 1.772499 | ν1 = 49.6 |
| R2 = −53.451 | D2 = 0.07 | | |
| R3 = 8.156 | D3 = 0.15 | N2 = 1.712995 | ν2 = 53.9 |
| R4 = 1.815 | D4 = 0.53 | | |
| R5 = −6.491 | D5 = 0.15 | N3 = 1.670029 | ν3 = 47.2 |
| R6 = 1.561 | D6 = 0.38 | | |
| R7 = 1.931 | D7 = 0.33 | N4 = 1.846660 | ν4 = 23.9 |
| R8 = 3.509 | D8 = Variable | | |
| R9 = 0.842 | D9 = 0.40 | N5 = 1.740130 | ν5 = 49.2 |
| R10 = 2.563 | D10 = 0.10 | N6 = 1.805181 | ν6 = 25.4 |
| R11 = 0.774 | D11 = 0.18 | | |
| R12 = Stop | D12 = 0.09 | | |
| R13 = 3.209 | D13 = 0.25 | N7 = 1.772499 | ν7 = 49.6 |
| R14 = −3.092 | D14 = Variable | | |
| R15 = 8.080 | D15 = 0.30 | N8 = 1.772499 | ν8 = 49.6 |
| R16 = −2.321 | D16 = 0.09 | N9 = 1.846660 | ν9 = 23.9 |
| R17 = −5.875 | D17 = Variable | | |
| R18 = ∞ | D18 = 0.36 | N10 = 1.516330 | ν10 = 64.1 |
| R19 = ∞ | | | |

| | Focal Length | | |
|---|---|---|---|
| Variable Interval | 1.00 | 2.09 | 2.88 |
| D8 | 2.83 | 0.80 | 0.28 |
| D14 | 0.83 | 2.14 | 3.09 |
| D17 | 0.52 | 0.52 | 0.52 |

Aspherical Coefficient

R9 k = 1.32227e−01  B = −1.14740e−01  C = −1.04956e−01
D = −1.71620e−01  E = −2.26487e−01

NUMERICAL EXAMPLE 3

| | | | |
|---|---|---|---|
| f = 1 to 2.87 | Fno = 2.79 to 4.80 | 2ω = 62.7° to 23.9° | |
| R1 = 5.422 | D1 = 0.73 | N1 = 1.603112 | ν1 = 60.6 |
| R2 = −24.867 | D2 = 0.07 | | |
| R3 = 3.755 | D3 = 0.15 | N2 = 1.712995 | ν2 = 53.9 |
| R4 = 1.790 | D4 = 0.53 | | |
| R5 = −5.084 | D5 = 0.15 | N3 = 1.670029 | ν3 = 47.2 |
| R6 = 1.447 | D6 = 0.38 | | |
| R7 = 1.789 | D7 = 0.33 | N4 = 1.805181 | ν4 = 25.4 |
| R8 = 2.775 | D8 = Variable | | |
| R9 = 0.885 | D9 = 0.40 | N5 = 1.743300 | ν5 = 49.3 |
| R10 = 0.836 | D10 = 0.18 | | |
| R11 = Stop | D11 = 0.09 | | |
| R12 = 3.946 | D12 = 0.36 | N6 = 1.696797 | ν6 = 55.5 |
| R13 = −1.178 | D13 = 0.09 | N7 = 1.846660 | ν7 = 23.9 |
| R14 = −2.204 | D14 = Variable | | |
| R15 = 5.136 | D15 = 0.30 | N8 = 1.772499 | ν8 = 49.6 |
| R16 = −2.284 | D16 = 0.09 | N9 = 1.846660 | ν9 = 23.9 |
| R17 = −7.559 | D17 = Variable | | |
| R18 = ∞ | D18 = 0.36 | N10 = 1.516330 | ν10 = 64.1 |
| R19 = ∞ | | | |

| | Focal Length | | |
|---|---|---|---|
| Variable Interval | 1.00 | 2.09 | 2.87 |
| D8 | 2.62 | 0.84 | 0.39 |
| D14 | 0.66 | 2.30 | 3.49 |
| D17 | 0.75 | 0.75 | 0.75 |

Aspherical Coefficient

R9 k = 1.03774e−01  B = −8.83951e−02  C = −1.06559e−01
D = 1.06695e−01  E = −5.49767e−01

NUMERICAL EXAMPLE 4

| | | | |
|---|---|---|---|
| f = 1 to 3.02 | Fno = 2.76 to 4.80 | 2ω = 62.9° to 22.9° | |
| R1 = 19.057 | D1 = 0.29 | N1 = 1.802380 | ν1 = 40.7 |
| R2 = 0.967 | D2 = 0.34 | | |
| R3 = 1.809 | D3 = 0.38 | N2 = 1.846660 | ν2 = 23.9 |
| R4 = 6.158 | D4 = Variable | | |
| R5 = 0.883 | D5 = 0.40 | N3 = 1.740130 | ν3 = 49.2 |
| R6 = 2.228 | D6 = 0.11 | N4 = 1.647689 | ν4 = 33.8 |
| R7 = 0.757 | D7 = 0.29 | | |
| R8 = Stop | D8 = 0.09 | | |
| R9 = 1.966 | D9 = 0.09 | N5 = 1.846660 | ν5 = 23.9 |

-continued

| | | | |
|---|---|---|---|
| R10 = 1.101 | D10 = 0.33 | N6 = 1.603112 | v6 = 60.6 |
| R11 = −3.172 | D11 = Variable | | |
| R12 = 2.504 | D12 = 0.27 | N7 = 1.487490 | v7 = 70.2 |
| R13 = −14.081 | D13 = Variable | | |
| R14 = ∞ | D14 = 0.37 | N8 = 1.516330 | v8 = 64.1 |
| R15 = ∞ | | | |

| | Focal Length | | |
|---|---|---|---|
| Variable Interval | 1.00 | 2.13 | 3.02 |
| D4 | 3.05 | 0.80 | 0.21 |
| D11 | 0.74 | 2.30 | 3.44 |
| D13 | 0.73 | 0.59 | 0.49 |

Aspherical Coefficient

R2 k = −1.93649e+00   B = 1.63156e−01   C = −6.26538e−02
D = 2.90381e−02   E = −7.44152e−03
R5 K = −1.16109e−01   B = −4.82655e−02   C = −2.15781e−02
D = −8.13904e−02   E = 1.42574e−02

TABLE 1

| | Numerical Examples | | | |
|---|---|---|---|---|
| | 1 | 2 | 3 | 4 |
| Conditional Expression (1) | 1.696 | 1.127 | 0.788 | 1.053 |
| Conditional Expression (2) | 0.287 | 0.356 | 0.368 | 0.322 |
| Conditional Expression (3) | 0.167 | 0.312 | 0.256 | 0.342 |

According to each embodiment, in a three-unit zoom lens comprising lens units having negative, positive and positive optical powers, respectively, the entire lens length can be shortened on the telephoto end, and the exit pupil can be sufficiently apart from the image plane while the number of the constituent elements of the second lens unit is small, and the lens barrel of the second lens unit is small in size, the zoom lens is made compact as a whole, so that the zoom lens is suitable for a camera which employs a solid state image pickup device.

Next, an embodiment of a digital camera which employs the zoom lens according to the present invention as a photographing optical system will be described with reference to FIG. 17.

In FIG. 17, reference symbol 10 denotes a camera main body, 11 denotes a photographing optical system consisting of the zoom lens according to the present invention, 12 denotes a stroboscope built in the camera main body 10, 13 denotes an external finder, and 14 denotes a shutter button. The photographing optical system 11 forms a subject image on a solid state image pickup device (not shown) such as a CCD or a CMOS. The solid state image pickup device receives the image formed by the photographing optical system 11 and converts the image into electrical information. Image information on the subject converted into the electrical information is stored in a storage section (not shown).

By applying the zoom lens according to the present invention to a camera such as a digital camera, it is possible to realize a camera small in size and high in optical performance.

What is claimed is:

1. A zoom lens comprising, in order from an object side to an image side:

a first lens unit having a negative optical power, the first lens unit including a meniscus negative lens element having a concave lens surface on the image side, and a meniscus positive lens element having a convex lens surface on the object side;

a second lens unit having a positive optical power, the second lens unit consisting of, in the order from the object side to the image side, a lens element having a convex lens surface, or a cemented lens having a convex lens surface, on the object side of an aperture stop, and one or two lens elements; and a third lens unit having a positive optical power, wherein a distance between the first lens unit and the second lens unit upon the telephoto end is shorter than that on the wide angle end and a distance between the second lens unit and the third lens unit upon the telephoto end is longer than that upon the wide angle end, and said zoom lens satisfies the following condition, $$0.6 < (D12W - D12T)/(D23T - D23W) < 2.0,$$

where D12W is the distance between the first lens unit and the second lens unit upon the wide angle end, D23W is the distance between the second lens unit and the third lens unit upon the wide angle end, D12T is the distance between the first lens unit and the second lens unit upon the telephoto end, and D23T is the distance between the second lens unit and the third lens unit upon the telephoto end.

2. A zoom lens according to claim 1, wherein at least one of said one or two lens elements in said second lens unit has a concave lens surface on the image side.

3. A zoom lens according to claim 2, wherein said zoom lens satisfies the following condition, $$0.2 < Rn/f2 < 0.5,$$

wherein Rn is a radius of curvature of the concave lens surface of said one or two lens elements of said second lens unit and f2 is a focal length of the second lens unit.

4. A zoom lens according to claim 1, wherein said zoom lens satisfies the following condition, $$0.1 < D2sp/f2 < 0.4,$$

where f2 is a focal length of said second lens unit and D2sp is a distance between a vertex of a lens surface closet to the object side in said second lens unit and said aperture stop.

5. A zoom lens according to claim 1, wherein a positive lens element having both convex lens surfaces is arranged to be closest to the object side in said second lens unit.

6. A zoom lens according to claim 1, wherein a cemented lens in which a positive lens element having a convex surface on the object side is cemented to a negative lens element having a concave surface on the image side, is arranged to be closest to the object side in said second lens unit.

7. A zoom lens according to claim 1, wherein a single lens element having a convex surface on the object side and a concave surface on the image side, is arranged to be closest to the object side in said second lens unit.

8. A zoom lens according to claim 1, wherein at least one of a single lens element and a cemented lens is arranged on the image side relative to the aperture stop in said second lens unit.

9. A zoom lens according to claim 1, wherein said second lens unit consists of a positive lens element having both convex lens surfaces, an aperture stop, and a cemented lens in which a positive lens element having both convex lens surfaces is cemented to a negative lens element having both concave lens surfaces, in the order from the object side to the image side.

10. A zoom lens according to claim 1, wherein said second lens unit consists of a cemented lens in which a meniscus positive lens element having a convex lens surface on the object side is cemented to a meniscus negative element having a convex lens surface on the object side, an aperture stop, and a positive lens element having both convex lens surfaces, in the order from the object side to the image side.

11. A zoom lens according to claim 1, wherein said second lens unit consists of a meniscus lens element having a convex lens surface on the object side, an aperture stop, and a cemented lens in which a positive lens element having both convex lens surfaces is cemented to a negative lens element having a concave lens surface on the object side, in the order from the object side to the image side.

12. A zoom lens according to claim 1, wherein said second lens unit consists of a cemented lens in which a meniscus positive lens element having a convex lens surface on the object side is cemented to a meniscus negative element having a convex lens surface on the object side, an aperture stop, and a cemented lens in which a meniscus negative lens element having a convex surface on the object side is cemented to a positive lens element having both convex lens surfaces, in the order from the object side to the image side.

13. A zoom lens according to claim 1, wherein said first lens unit consists of a positive lens element having both convex lens surfaces, a meniscus negative lens element having a convex surface on the object side, a negative lens element having both concave lens surfaces, and a meniscus positive lens element having a convex surface on the object side, in the order from the object side to the image side.

14. A zoom lens according to claim 1, wherein said first lens unit consists of a meniscus negative lens element having a convex surface on the object side, and a meniscus positive lens element having a convex surface on the object side, in the order from the object side to the image side.

15. A zoom lens according to claim 1, wherein said third lens unit consists of a cemented lens in which a positive lens element having both convex lens surfaces, and a negative lens element having a concave lens surface on the object side, in the order from the object side to the image side.

16. A zoom lens according to claim 1, wherein said third lens unit consists of a positive lens element having both convex lens surfaces.

17. A zoom lens according to claim 1, wherein said zoom lens forms an image on a solid state image pickup device.

18. A camera comprising:

a zoom lens according to claim 1; and a solid state image pickup device receiving an image formed by said zoom lens.

* * * * *